United States Patent
Brüse

(10) Patent No.: US 12,152,218 B2
(45) Date of Patent: Nov. 26, 2024

(54) LIQUID OILS WITHOUT UNWANTED CONTAMINANTS

(71) Applicant: Cargill, Incorporated, Wayzata, MN (US)

(72) Inventor: Falk Brüse, Drensteinfurt (DE)

(73) Assignee: Cargill, Incorporated, Wayzata, MN (US)

( * ) Notice: Subject to any disclaimer, the term of this patent is extended or adjusted under 35 U.S.C. 154(b) by 978 days.

(21) Appl. No.: 16/966,564

(22) PCT Filed: Feb. 7, 2019

(86) PCT No.: PCT/US2019/016994
§ 371 (c)(1),
(2) Date: Jul. 31, 2020

(87) PCT Pub. No.: WO2019/157141
PCT Pub. Date: Aug. 15, 2019

(65) Prior Publication Data
US 2020/0362265 A1   Nov. 19, 2020

(30) Foreign Application Priority Data
Feb. 7, 2018   (EP) ..................... 18155453

(51) Int. Cl.
| | | |
|---|---|---|
| C11B 3/10 | (2006.01) | |
| A23D 9/04 | (2006.01) | |
| A23D 9/06 | (2006.01) | |
| A23L 5/20 | (2016.01) | |
| A23L 33/00 | (2016.01) | |
| B01J 20/08 | (2006.01) | |
| C11B 3/00 | (2006.01) | |

(52) U.S. Cl.
CPC ............. *C11B 3/10* (2013.01); *A23D 9/04* (2013.01); *A23D 9/06* (2013.01); *A23L 5/273* (2016.08); *A23L 33/40* (2016.08); *B01J 20/08* (2013.01); *C11B 3/001* (2013.01); *A23V 2002/00* (2013.01)

(58) Field of Classification Search
CPC ... A23L 5/273; A23L 5/20; C11B 3/10; C11B 1/04; C11B 9/022; A23D 9/04; B01J 20/08
See application file for complete search history.

(56) References Cited

U.S. PATENT DOCUMENTS

| | | | | |
|---|---|---|---|---|
| 3,862,054 A | * | 1/1975 | Sokolsky ............. | B01J 20/2803 502/415 |
| 11,643,617 B2 | * | 5/2023 | Brüse ...................... | B01J 20/08 554/191 |
| 2012/0259133 A1 | | 10/2012 | Homma | |
| 2016/0298053 A1 | | 10/2016 | Brüse | |

FOREIGN PATENT DOCUMENTS

| | | |
|---|---|---|
| CN | 102666823 A | 9/2012 |
| CN | 102711496 A | 10/2012 |
| CN | 103596445 A | 2/2014 |
| CN | 104159454 A | 11/2014 |
| JP | 2016040366 A | 3/2016 |
| RU | 2360952 C2 | 7/2009 |
| RU | 2556718 C2 | 7/2015 |
| WO | 2004002232 A1 | 1/2004 |
| WO | 2010063450 A1 | 6/2010 |
| WO | 2010126136 A1 | 11/2010 |
| WO | 2012001015 A1 | 1/2012 |
| WO | 2012169718 A1 | 12/2012 |
| WO | 2017035403 A1 | 3/2017 |

OTHER PUBLICATIONS

The effects of Physical Refining on the Formation of 3-monochloropropane-1, 2-diol esters in relation to palm oil minor components. Food Chemistry, Elsevier Ltd., NL, vol. 135, No. 2, Apr. 30, 2012, pp. 799-805.
HAN Jingsheng. "Oil Refining Technology", 1st Edition. China Financial and Economic Publishing House, p. 159, Jun. 30, 1989.
LUO Zhi. "Oil Refining Technology", 1st Edition. China Light Industry Press, p. 87-88, Jun. 30, 2016.
Stryzhenok A.A. "Improving the technology of adsorption refining of vegetable oils. Thesis paper", Krasnodar, 2015, p. 50.
Zelinkova Z et al.: "Fatty acid esters of 3-chloropropane-1,2-diol in edible oils", Food Additives and Contaminants, Taylor and Francis London, GB, 2 vol. 23, No. 12, Jan. 1, 2006 (Jan. 1, 2006), pp. 1290-1298, XP009125455, ISSN: 0265-203X, DOI: 10.1080/02652030600887628.

* cited by examiner

*Primary Examiner* — Hong T Yoo

(57) ABSTRACT

The present invention relates to a process for preparing purified vegetable liquid oil, and the process is comprising contacting a vegetable liquid oil, which has not been subjected to a deodorization step, with an adsorbent comprising alumina oxide and wherein the adsorbent has a content of alumina oxide of not more than 9.5% and the obtained deodorized vegetable liquid oils.

15 Claims, No Drawings

LIQUID OILS WITHOUT UNWANTED CONTAMINANTS

CROSS REFERENCE TO RELATED APPLICATIONS

This application is a national phase application of PCT/US2019/016994, filed 7 Feb. 2019, entitled LIQUID OILS WITHOUT UNWANTED CONTAMINANTS, which claims the benefit of priority to European Provisional Application No. 18155453.6, filed 7 Feb. 2018, entitled LIQUID OILS WITHOUT UNWANTED CONTAMINANTS, which are hereby incorporated by reference in their entirety.

FIELD OF THE INVENTION

Use of bleaching step using an adsorbent containing not more than 9.5% alumina oxide to reduce unwanted contaminants, such as unwanted propanol components.

BACKGROUND OF THE INVENTION

Crude oils, as extracted from their original source, are not suitable for human consumption due to the presence of high levels of contaminants—such as free fatty acids, phosphatides, soaps and pigments—which may be either toxic or may cause an undesirable color, odor or taste. Crude oils are therefore refined before use. The refining process typically consists of the following major steps: degumming and/or alkali refining, bleaching and deodorizing. An oil obtained after completion of the refining process (called a "NBD" or "RBD oil") is normally considered suitable for human consumption and may therefore be used in the production of any number of foods and beverages.

Unfortunately, it has now been found that the refining process itself contributes to the introduction, of high levels of unwanted propanol components into the refined oil.

A lot of efforts have been taken to reduce the levels of these unwanted propanol components such as free chloropropanols, chloropropanol fatty acid esters, free epoxypropanols, epoxypropanol fatty acid esters, and combinations thereof. A lot of diverse processes have been developed in order to avoid, to mitigate or to reduce the content of these unwanted propanol components. These diverse processes each have been concerned with amending the process conditions of at least one or more of the standard refining steps. These diverse processes each have been concerned with amending the process conditions (e.g. process time, process temperature etc.) of at least one or more of the standard refining steps. These adaptations of the standard process conditions, may have a negative impact on other quality parameters of the oil such as color, taste and oxidation stability. A well-known procedure to avoid formation of unwanted chloropropanols is the reduction of the deodorization time and/or temperature. Usually, deodorization time and/or temperature in the standard process is selected to get the most promising results in respect of break-down and/or removal of color molecules, off-flavors and oxidation products. However, selecting a process with a lower deodorization temperature and/or shorter time may have to be compensated by further adaptations to the other process steps in oil refining process.

Yet, there is still a need for a process allowing to obtain a vegetable liquid oil with low or negligible amounts of these unwanted propanol components, while maintaining high quality in all other aspects of the oil.

The current invention provides such a process and such an oil.

SUMMARY OF THE INVENTION

The current invention relates to a process for preparing purified vegetable liquid oil, and the process is comprising contacting a vegetable liquid oil, which has not been subjected to a deodorization step, with an adsorbent comprising alumina oxide and wherein the adsorbent has a content of alumina oxide of not more 9.5% preferably not more than 9%, more preferably not more than 8.5% (wt %).

It further relates to a deodorized vegetable liquid oil selected from the group consisting of oils from cotton, corn, groundnut, linseed, olive, rape, canola, sesame, safflower, soybean, sunflower, their corresponding high oleic varieties, and mixture of two or more thereof and said oil is being characterized by a content of free chloropropanols, and chloropropanol fatty acid esters in an amount of less than 190 µg/kg, preferably in an amount of less than 180 µg/kg, less than 170 µg/kg, less than 150 µg/kg, more preferably less than 100 µg/kg, less than 90 µg/kg, less than 80 µg/kg, less than 70 µg/kg, less than 60 µg/kg, and even most preferably less than 50 µg/kg and a food product comprising food ingredients and the deodorized vegetable liquid oil of the present invention.

Finally it relates to the use of an adsorbent to mitigate or eliminate the formation of chloropropanol fatty acid esters in a process for producing deodorized vegetable liquid oils and wherein the adsorbent is having a content of alumina oxide not more than 9.5%.

DETAILED DESCRIPTION

The current invention relates to process for preparing purified vegetable liquid oil, and the process is comprising contacting a vegetable liquid oil, which has not been subjected to a deodorization step, with an adsorbent comprising alumina oxide and wherein the adsorbent has a content of alumina oxide of not more than 9.5%, preferably not more than 9%, more preferably not more than 8.5% (wt %).

Preferably the content of alumina oxide is in the range of 0.5 to 9%, 1 to 9%, and a more preferred range is from 2 to 8.5%. Further suitable levels likewise are in the range of 2 to 4%, 2.5 to 6.3%, 3 to 5% or 4 to 7%, or 2.5 to 6.5%.

Without being bound by any theory, the process according to the present invention, and in particular the contacting of the vegetable oil with an adsorbent having a content of alumina oxide of less than 9.5%, will allow to remove or to reduce the content of precursors of chloropropanol compounds. Due to this reduction or removal of these precursors, there is less of a need to lower the deodorization temperature and thus avoiding formation of chloropropanol compounds at high temperatures. The lowered, reduced or eliminated content of precursors of chloropropanol compounds will have a positive impact on the reduction or elimination of formation of chloropropanol compounds at high temperatures.

The vegetable liquid oil may be derived from vegetable liquid oils or vegetable liquid oil blends and/or fractionations thereof. The vegetable oil is liquid at room temperature (about 18 to 25° C.). The vegetable liquid oils are selected from the group consisting of oils from cotton, corn, groundnut, linseed, olive, rape, canola, sesame, safflower, soybean, sunflower, their corresponding mid or high oleic varieties or any variety with increased level of unsaturated fatty acids compared to the original seed variety, and mixture of two or more thereof. These varieties with increased levels of unsaturated fatty acids can be obtained by natural selection or by genetic modification (GMO). Preferably the vegetable oil is selected from the group consisting of corn, rape, canola, soybean, sunflower, their corresponding high oleic varieties, and mixture of two or more thereof. The high oleic varieties are containing at least 40%, at least 50%, at least 60%, at least 70%, preferably at least 80% oleic acid in respect of the fatty acid profile. Preferably the vegetable oil is selected from the group consisting corn, rape, canola, soybean, sunflower, and mixture of two or more thereof.

Most preferably the vegetable liquid oil is rapeseed oil, sunflower oil or combinations thereof.

The vegetable liquid oil applied in the process of the present invention has not been subjected to any deodorization step. The vegetable liquid oil may be crude, or refined oil in so far it has not been subjected to a deodorization step. The vegetable oil may be crude, or refined oil in so far it has not been subjected to a deodorization step. The vegetable oil may be degummed, and degumming may take place in presence of an acid. Preferably the vegetable oil, optionally degummed, oil is neutralized in presence of alkali.

The process of the present invention provides a purified vegetable liquid oil wherein the content of process contaminants, selected from the group consisting of free chloropropanols, chloropronanol fatty acid esters, and combinations of two or more thereof, is reduced, or eliminated.

In another aspect of the invention, the adsorbent is non-chemically activated, i.e. physically activated. More in particular, the adsorbent is not acid-activated. Furthermore, the adsorbents in the present invention are naturally occurring minerals that have been activated by physical means. They are not activated by chemical means. Without being limited to a specific physical activation of the adsorbent, a suitable physical activation may include or consist of a wetting, milling, filtration and thermal treatment, including drying. The thermal treatment may be of any type and may for example be a drying step, a microwave treatment or a heat treatment. In fact, the physically activated adsorbent may be more active than the corresponding natural occurring minerals or bleaching clays.

In another aspect of the invention, the adsorbent is having a content of earth alkali oxides of from 12 to 27% (wt %), from 15 to 25% (wt %), from 18 to 24% (wt %) or from 19 to 23% (wt %). Typical content may range from 13 to 24%, from 17 to 24%, from 19% to 24%, from 20 to 24%. More specifically these earth alkali oxides are magnesium oxides and calcium oxides, all expressed in wt %.

In another aspect of the invention the adsorbent is having a content of magnesium oxide from 11 to 25%, from 14 to 24%, from 17 to 23%, from 18 to 21% (wt %), from 19 to 22% (wt %).

Furthermore, preferably the adsorbent is having a pH of at least 6, preferably at least 7. Typically the pH is within the range of 6 to 8.5.

In another aspect of the invention, the adsorbent is added to the vegetable liquid oil in an amount of not more than 1% (w/w), not more than 0.6% (w/w), not more than 0.5% (w/w), not more than 0.4% (w/w), not more than 0.3% (w/w).

Typically, the contacting temperature (is bleaching temperature) whereby the vegetable liquid oil is contacted with the adsorbent, is in the range of from 70 to 110° C., in the range of 80 to 100° C., in the range of 90 to 95° C.

In another aspect of the invention, the process is comprising a treatment of the vegetable liquid oil in presence of a base, preferably an alkaline solution. This treatment in the presence of a base can occur anywhere in the process of the present invention. It may occur before, after, during and/or between the steps of the process of the present invention. Most commonly, the treatment in presence of alkaline solution is a neutralization step. If so desired, crude or degummed oil may be treated with alkaline solution. In such alkali refining step (=neutralization step), the oil is commonly mixed with a hot, aqueous alkali solution, producing a mixture of partially refined or "neutral" oil and soapstock. The soapstock is then separated off and the partially refined oil is delivered to the next refining step.

In an aspect of the present invention the process is comprising the following steps without any particular order:
a) contacting a vegetable liquid oil that has not been subjected to a deodorization process with an adsorbent comprising alumina oxide and wherein the adsorbent has a content of alumina oxide of less than 9.5%, preferably less than 9%, more preferably not more than 8.5% (wt %),
b) treating the vegetable liquid oil, optionally deodorized vegetable liquid oil with a base, preferably with alkali solution.

In another aspect of the invention, the vegetable oil treated with the adsorbent is deodorized at a temperature below 265° C., below 260° C., between 180° C. and 250° C., between 200° C. and 230° C., between 210° C. and 230° C., from 220° C. to 225° C. Due to the reduction or removal of the precursors of chloropropanol compounds in the process steps prior to the deodorization, there is less of a need to lower the deodorization temperature. Yet, the process of the present invention may include a deodorization step performed at a temperature lower than the temperature of a standard deodorization step that is well-known in the art.

In another aspect of the invention processing steps such as re-bleaching of the deodorized oil in presence of a bleaching agent and subsequent re-deodorization at temperature below 200° C. are optional process steps and may even further contribute to the purification of the vegetable liquid oil. The adsorbent used in the re-bleaching can be activated (non-chemically (physically), chemical (e.g. acid)) or a natural bleaching earth or combinations thereof.

Any of a variety of degumming processes known in the art may be used. One such process (known as "water degumming") includes mixing water optionally containing acid such as citric acid and/or phosphoric acid, with the crude oil and separating the resulting mixture into an oil component and an oil-insoluble hydrated phosphatides component, sometimes referred to as "wet gum" or "wet lecithin". Alternatively, phosphatide content can be reduced (or further reduced) by other degumming processes, such as acid degumming, enzymatic degumming (e.g., ENZYMAX from Lurgi) or chemical degumming (e.g., SUPERIUNI degumming from Unilever or TOP degumming from VandeMoortele/Dijkstra CS).

The deodorising step and its many variations and manipulations are well known in the art. Preferably, it will include introducing the oil into a deodoriser and contacting it with steam to vaporize and drive off free fatty acids (FFAs) and other volatile impurities, resulting in a deodorised oil and a vapour stream.

The deodoriser may be any of a wide variety of commercially available deodorizing systems, including both multi-chamber deodorisers (such as those sold by Krupp of Hamburg, Germany; De Smet Group, S A. of Brussels, Belgium; Gianazza Technology s.r.l. of Legnano, Italy; Alfa Laval AB of Lund, Sweden, or others) and multi-tray deodorisers (such as those sold by Krupp, DeSmet Group, S.A., and Crown Ironworks of the United States).

The deodoriser is desirably maintained at an elevated temperature and a reduced pressure to better volatilise the FFAs and other volatile impurities. Most often, the deodoriser will be maintained at a pressure of no greater than 10 mm Hg. Preferably, it will be maintained at a pressure of no greater than 5 mm Hg, e.g., 1-4 mm Hg.

A quantity of steam is delivered to the deodoriser, e.g. through low-pressure steam lines (at 1-5 Bar for example), and is then sprayed into the oil. As the steam, which may be superheated, bubbles through the oil, it will help strip it of its FFAs and other volatile impurities. The flow rate of steam through the oil will vary depending on the nature and quality of the oil being deodorised and the pressure and temperatures in the deodoriser. Generally, though, steam flow rates in the order of 0.7-2.5 weight percent (wt. %) of the oil flow rates should suffice for most common processing conditions. This produces a steam-containing vapour stream which is delivered from the deodoriser to one or more condensers.

In another aspect of the invention, the process of the present invention is comprising the sequence of the following steps and in the following order:
a) Optionally degumming of vegetable liquid oil,
b) Neutralising the vegetable liquid oil, optionally degummed oil in presence of alkali,
c) Bleaching the alkali treated oil in presence of an adsorbent wherein the content of alumina oxide is less than 10%,
d) Deodorizing the bleached oil at a deodorization temperature below 265° C.,
e) Optionally re-bleaching the deodorized oil in presence of a bleaching agent,
f) Optionally re-deodorizing the deodorized or re-bleached oil at a deodorization temperature below 200° C.

The deodorization temperature of step d) is below 265° C., below 260° C., between 180° C. and 250° C., between 200° C. and 230° C., between 210° C. and 230° C., from 220° C. to 225° C. The deodorization temperature of the optional step f) is below 200° C., between 130° C. and 200° C., between 150° C. and 195° C., between 170° C. and 180° C., preferably from 160 to 195° C.

The process according to the present invention may further comprise a re-bleaching step. This bleaching step is performed in presence of a bleaching agent. The adsorbent used in the re-bleaching can be an activated (non-chemically (physically), a chemical (e.g. acid)) or a natural bleaching earth or combinations thereof. The bleaching temperature is in the range of 70 to 110° C.

The process according to the present invention may further comprise a re-deodorization step. This further deodorization step is performed at a deodorization temperature below 200° C., between 130° C. and 200° C., between 150° C. and 195° C., between 170° C. and 180° C., preferably from 160 to 195° C.

The process of the current invention allows to reduce the total content of the process contaminants selected from the group consisting, free chloropropanols, chloropronanol fatty acid esters, and combinations of two or more thereof, by at least 40%, at least 50%, at least 60%, preferably it is reduced by at least 70%, at least 80%, at least 90% and even up to 95%, and thus obtaining the purified vegetable liquid oil, each time in comparison with a standard refined corresponding vegetable liquid oil i.e. a physical refined vegetable liquid oil, obtained by a standard refining process that is using max 1% of an acid-activated bleaching earth in the bleaching step and a deodorization step at 240° C. for 1 h.

In another aspect of the invention it has been shown that by applying the process of the invention and specifically including the treatment in presence of alkali, the total content of the process contaminants selected from the group consisting of free chloropropanols, chloropronanol fatty acid esters, and combinations of two or more thereof, by at least 50%, at least 60%, at least 70%, preferably it is reduced by at least 75%, at least 85%, at least 95% and even up to 99%, and thus obtaining the purified vegetable liquid oil, each time in comparison with a standard refined corresponding vegetable liquid oil i.e. a physical refined vegetable liquid oil, obtained by a standard refining process that is using max 1% of an acid-activated bleaching earth in the bleaching step and a deodorization step at 240° C. for 1 h.

In one aspect of the invention, the refining process, including an alkali neutralization step and using an adsorbent having a content of alumina oxide of less than 9.5 allows obtaining deodorized sunflower oil, with less than 100 ppb, less than 90 ppb of free chloropropanols, chloropropanol fatty acid esters and mixture of two or more thereof. This may correspond to a reduction of at least 76%, up to at least 79% compared with a standard refined oil i.e. a physical refined sunflower oil, obtained by a standard refining process that is using max 1% of an acid-activated bleaching earth bleaching earth in the bleaching step and a deodorization step at 240° C. for 1 h. More specifically, the obtained deodorized sunflower oil has a content of less than 90 ppb of free chloropropanols, chloropropanol fatty acid esters and mixture of two or more thereof, by using the process of the present invention and contacting the oil with an adsorbent having a content of alumina oxide of less than 9.5% and having a content of earth alkali oxides of from 12 to 27% (wt %)

In one aspect of the invention, the refining process, including an alkali neutralization step and using an adsorbent having a content of alumina oxide of less than 9.5 and having a content of earth alkali oxides of from 12 to 27% (wt %) allows obtaining deodorized rapeseed oil, with less than 100 ppb, less than 90 ppb of free chloropropanols, chloropropanol fatty acid esters and mixture of two or more thereof.

Furthermore, the present invention relates to a deodorized vegetable liquid oil is selected from the group consisting of oils from cotton, corn, groundnut, linseed, olive, rape, canola, sesame, safflower, soybean, sunflower, their corresponding high oleic varieties, and mixture of two or more thereof, said deodorized vegetable liquid oil being characterized by a content of free chloropropanols, chloropropanol fatty acid esters and mixture of two or more thereof in an amount of less than 190 µg/kg, in an amount of less than 185 µg/kg, less than 180 µg/kg, less than 170 µg/kg, less than 150 µg/kg, less than 100 µg/kg, less than 90 µg/kg, less than 80 µg/kg, less than 70 µg/kg, less than 60 µg/kg, less than 40 µg/kg and less than 40 µg/kg, and even less than 30 µg/kg (=ppb).

Preferably the vegetable oil is selected from the group consisting corn, rape, canola, soybean, sunflower, their corresponding high oleic varieties, and mixture of two or more thereof. The high oleic varieties are containing at least containing at least 40%, at least 50%, at least 60%, at least 70%, preferably at least 80% oleic acid in respect of the fatty acid profile. Preferably the vegetable oil is selected from the group consisting corn, rape, canola, soybean, sunflower, and mixture of two or more thereof. Most preferably the vegetable liquid oil is rapeseed oil, sunflower oil or combinations thereof.

The process of the present invention allows obtaining deodorized vegetable liquid oils according to specifications in respect of color (red & yellow), taste score and oxidation stability; i.e. color red of max 1.5, color yellow of max 15, a flavor quality score of at least 9 (10 being an excellent quality and 1 being the worst quality) and an OSI (at 110° C.) of at least 4.2 hours.

In one aspect of the invention it relates to a deodorized sunflower oil characterized by a content of free chloropropanols, chloropropanol fatty acid esters and mixture of two or more thereof in an amount of less than 100 μg/kg, less than 90 μg/kg, less than 80 μg/kg, less than 70 μg/kg, less than 60 μg/kg, less than 50 μg/kg and less than 40 μg/kg, and even less than 30 μg/kg (=ppb).

In one aspect of the invention it relates to a deodorized rapeseed oil characterized by a content of free chloropropanols, chloropropanol fatty acid esters and mixture of two or more thereof in an amount of less than 100 μg/kg, less than 90 μg/kg, less than 80 μg/kg, less than 70 μg/kg, less than 60 μg/kg, less than 50 μg/kg (=ppb).

Unless specified otherwise, the content of free chloropropanols, chloropropanol fatty acid esters and mixture of two or more thereof is determined by using Method DGF Standard Methods Section C (Fats) C-VI 18(10) (Assay B).

It is worthwhile mentioning that current existing analytical methods in general have an LOQ (limit of quantification) of about 100 μg/kg. This means that levels below 100 μg/kg are only taking into account when several repetitions, (i.e. at least 3 times) of the analytical method provide consistently the same or similar levels of below 100 μg/kg. In certain products of the invention the analytical method provides values less than 90 μg/kg, less than 80 μg/kg, less than 70 μg/kg, less than 60 μg/kg and less than 50 μg/kg and less than 40 μg/kg, and even less than 30 μg/kg (=ppb). These values are taken into account when several repetitions, (i.e. at least 3 times) of the analytical method provide consistently the same or similar levels of less than 90 μg/kg, less than 80 μg/kg, less than 70 μg/kg, less than 60 μg/kg or even below 50 μg/kg. Under these circumstances the product is quantified as having a content of less than 90 μg/kg, less than 80 μg/kg, less than 70 μg/kg, less than 60 μg/kg or less than 50 μg/kg and less than 40 μg/kg, and even less than 30 μg/kg (=ppb).

The present invention further relates to a food product comprising food ingredients and the deodorized vegetable liquid oil according to the present invention. The food product comprises the deodorized vegetable liquid oil of the present invention in an amount of 0.3 to 80%. Such a food product may be an infant food, food for elderly people, confectionary, frying oil, table oil or salad dressing.

Infant food is a term well-known in the art and it refers to food that is specifically manufactured for infants and it may be characterized in that is soft, and easily consumable by infants and has a nutritional composition adapted to the specific needs at each growth stage. Food for elderly is the specialized nutrition that is suitable for elderly people that have trouble with eating in general. The trouble with it may be due to dental problems causing difficulties with chewing, or problems with swallowing or motor skill feeding problems or anything else which may lead to malnutrition. The food for elderly people is a class of food that can overcome or reduce these troubles mainly due to its adapted consistency, shape and/or portion. Such food of elderly does not need to be limited to elderly people per se. Anyone suffering from similar symptoms that may cause malnutrition can benefit from this type of food.

Finally, the present invention relates to the use of an adsorbent to mitigate or eliminate the formation of chloropropanol fatty acid esters in a process for producing deodorized vegetable liquid oils and wherein the adsorbent is having a content of alumina oxide not more than 9.5%.

In one aspect of the present invention it relates to the use of an adsorbent to mitigate or eliminate the content of precursors of chloropropanol fatty acid esters in a process for producing deodorized vegetable liquid oils.

More in particular, it relates to the use wherein the adsorbent is having a content of earth alkali oxides of is having a content of earth alkali oxides of from 12 to 27%, from 15 to 25% (wt %), from 18 to 24% (wt %) or from 19 to 23% (wt %). Typical content may range from 13 to 24%, from 17 to 24%, from 19% to 24%, from 20 to 24%.

Furthermore, in another aspect of the invention, it relates to the use wherein the adsorbent is non-chemically activated.

In yet another aspect of the invention it relates to the use wherein the adsorbent is having a content of magnesium oxide from 11 to 25%, from 14 to 24%, from 17 to 23%, from 18 to 21% (wt %), from 19 to 22% (wt %).

It further relates to the use of the present invention wherein the adsorbent is applied in an amount the adsorbent is added to the vegetable liquid oil in an amount of not more than 1% (w/w), not more than 0.6% (w/w), not more than 0.5% (w/w), not more than 0.4% (w/w), not more than 0.3% (w/w).

Finally, it relates to the use wherein the adsorbent is used in a bleaching step of the process for producing deodorized vegetable liquid oils, more preferably in a bleaching step of a process further comprising a treatment in presence of a base, preferably an alkali solution.

In fact, the use of the present invention allows to mitigate or eliminate the formation of chloropropanol fatty acid esters by at least 50%, at least 60%, at least 70%, preferably it is reduced by at least 75%, at least 85%, at least 95% and even up to 99%, in comparison to the reference, i.e. a standard refined corresponding vegetable liquid oil i.e. a physical refined vegetable liquid oil, obtained by a standard refining process that is using max 1% of an acid-activated bleaching earth in the bleaching step and a deodorization step at 240° C. for 1 h.

EXAMPLES

Method of Analysis

The 3-MCPD content in the deodorized oil was measured according to Method DGF Standard Methods Section C (Fats) C-VI 18(10) (assay B). Levels below 100 μg/kg are only taking into account when several repetitions, (i.e. at least 3 times) of the analytical method provide consistently the same or similar levels of below 100 μg/kg.

Color (red, yellow and, specifically for rapeseed oil, blue) was measured according to the Lovibond method (official AOCS method Cc13e-92). A 5¼ inch glass measuring cell was used.

The oxidative stability of the oil is assessed by measuring of the induction time which characterizes the resistance of the oil to oxidation at a specified temperature. The induction time is expressed as Oil Stability Index (OSI). A suitable method is the measurement using a Rancimat equipment (Metrohm) according to AOCS method Cd12b-92.

The oils were tasted and evaluated for their flavor quality. A flavor quality score was given according to AOCS method Cg 2-83, where a flavour quality score of 10 is an excellent quality and a flavour quality score of 1 is the worst.

Example 1—Sunflower Oil 100 g neutralized sunflower oil was bleached using bleaching clay as specified in table 1. Bleaching was carried out at 90° C. for 5 minutes at atmospheric pressure, followed by 20 minutes at 150 mbar and finally 5 minutes at full vacuum. After bleaching, the bleaching clay was removed from the oil by filtration (0.45 μm filter).

The oil was then heated for 2 h at 200° C.

3 MCPD was measured. Levels below 100 μg/kg are only taking into account when several repetitions, (i.e. at least 3 times) of the analytical method provide consistently the same or similar levels of below 100 μg/kg.

TABLE 1

| Activation | Comparative example Acic activated | Sample 1.1 | Sample 1.2 | Sample 1.3 |
|---|---|---|---|---|
| | | Non-chemically activated (the same for 1.1; 1.2 and 1.3) | | |
| Bleaching Clay characteristics | | | | |
| $SiO_2$ | 76.2% | 57.4% | | |
| $Al_2O_3$ | 11.2% | 2.6% | | |
| $Fe_2O_3$ | 2.7% | 13.7% | | |
| CaO | 2.3% | 0.8% | | |
| MgO | 0.8% | 19.1% | | |
| pH | 3.3 | 8.5 | | |
| Bleaching clay dosage | 1% | 1% | 0.6% | 0.3% |
| Analysis of the oil after deodorization | | | | |
| 3MCPD | 420 ppb | 29 ppb | 37 ppb | 38 ppb |

Example 2—Sunflower Oil

Crude sunflower oil was neutralized at 90° C. by dosing in a first step phosphoric acid (75% concentration, amount is based upon content of non-hydratable phospholipids) and subsequently a 15% NaOH solution (amount based on the FFA (free fatty acids) content, and added with 13-19% excess) and water (10% based the crude oil amount) In a next step the oil was washed with 10% water.

The neutralized oil was dried at 95° C. and pressure of 70-100 mbar and then bleached with 0.40% of the bleaching clay characterized in table 2, and 0.05% active carbon. The oil is bleached for 50 min at 95° C. at a pressure of about 77 mbar.

After removing the bleaching clay, and active carbon the oil was subsequently deodorized at a temperature of 230° C. during 40 minutes at pressure of 1 mbar, using 0.9% of sparge steam.

The 3 MCPD content in the deodorized oil was measured. Levels below 100 μg/kg are only taking into account when several repetitions, (i.e. at least 3 times) of the analytical method provide consistently the same or similar levels of below 100 μg/kg.

Color (red & yellow), flavor quality score and oxidation stability of the resulting deodorized oils was according to specifications i.e. Color red of max 1.5, color yellow of max 15, a flavor quality of at least 9 and an OSI (at 110° C.) of at least 4.2 hours.

TABLE 2

| Activation | Non-chemically activated |
|---|---|
| Bleaching Clay characteristics | |
| pH | 7 |
| $SiO_2$ | 56.3% |
| $Al_2O_3$ | 6.2% |
| $Fe_2O_3$ | 2.1% |
| CaO | 1.3% |
| MgO | 22.3% |
| Analysis of the oil after deodorization | |
| 3MCPD | 84 ppb (mean value of 6 different trials) |

Examples 3—Rapeseed Oil

Crude rapeseed oil was neutralized at 90° C. by dosing in a first step phosphoric acid (75% concentration, amount based upon content of non-hydratable phospholipids) and subsequently a 15% NaOH solution (amount based upon content of the FFA content added with 13-19% excess) and water (10% based the crude oil amount) In a next step the oil was washed with 10% water.

The neutralized oil was dried at 95° C. and pressure 70-100 mbar and then bleached with 0.45% of the bleaching clay characterized in table 3 and 0.05% active carbon. The oil was bleached for 50 min at 95° C. at a pressure of about 77 mbar.

After removing the bleaching clay and active carbon, the oil was subsequently deodorized at a temperature of 230° C. during 40 minutes at pressure of 1 mbar, using 0.9% of sparge steam.

The 3 MCPD content in the deodorized oil was measured. Levels below 100 μg/kg are only taking into account when several repetitions, (i.e. at least 3 times) of the analytical method provide consistently the same or similar levels of below 100 μg/kg.

Color (red, yellow & blue), flavor quality and oxidation stability of the resulting deodorized oils was according to specifications i.e. color red of max 1.5, color yellow of max 15, color blue of max 0.3, a flavor quality score of at least 9 and an OSI (at 110° C.) of at least 4.2 hours.

TABLE 3

| Activation | Non-chemically activated |
|---|---|
| Bleaching Clay characteristics | |
| pH | 7 |
| $SiO_2$ | 56.3% |
| $Al_2O_3$ | 6.2% |
| $Fe_2O_3$ | 2.1% |
| CaO | 1.3% |
| MgO | 22.3% |
| Analysis of the oil after deodorization | |
| 3MCPD | 88 ppb (mean value of 6 different trials) |

The invention claimed is:

1. A process for preparing purified vegetable liquid oil, comprising contacting a vegetable liquid oil, which has not been subjected to a deodorization step, with an adsorbent comprising alumina oxide in an amount of not more than 9.5 wt % based on total adsorbent weight.

2. The process according to claim 1 wherein the adsorbent is non-chemically activated.

3. The process according to claim 1, wherein the adsorbent has a content of earth alkali oxides of from 12 to 27 wt % based on total adsorbent weight.

4. The process according to claim 1, wherein the adsorbent has a content of magnesium oxide of from 11 to 25 wt % based on total adsorbent weight.

5. A process for preparing purified vegetable liquid oil, comprising contacting a vegetable liquid oil, which has not been subjected to a deodorization step, with an adsorbent comprising alumina oxide in an amount of not more than 9.5 wt % based on total adsorbent weight, wherein the adsorbent is contacted with the vegetable liquid oil by adding the adsorbent to the vegetable liquid oil in an amount of not more than 1% (w/w) and subsequently removed from the vegetable liquid oil by filtration.

6. The process according to claim 5, wherein the adsorbent is contacted with the vegetable liquid oil by adding the adsorbent to the vegetable liquid oil in an amount of not more than 0.6% (w/w).

7. The process according to claim 5, wherein the adsorbent is contacted with the vegetable liquid oil by adding the adsorbent to the vegetable liquid oil in an amount of not more than 0.6% (w/w).

8. The process according to claim 5, wherein the adsorbent is contacted with the vegetable liquid oil by adding the adsorbent to the vegetable liquid oil in an amount of not more than 0.5% (w/w).

9. The process according to claim 5, wherein the adsorbent is contacted with the vegetable liquid oil by adding the adsorbent to the vegetable liquid oil in an amount of not more than 0.4% (w/w).

10. The process according to claim 1, wherein the process comprises a treatment of the vegetable liquid oil in presence of a base.

11. The process according to claim 1, wherein the process comprises the sequence of the following steps:
    a) degumming of the vegetable liquid oil to form a degummed oil,
    b) neutralising the degummed oil in presence of alkali to form an alkali treated oil,
    c) bleaching the alkali treated oil in presence of an adsorbent comprising alumina oxide in an amount less than 9.5 wt % based on total adsorbent weight and the content of earth alkali metal oxides is from 12 to 27 wt % to provide a bleached oil,
    d) deodorizing the bleached oil at a deodorization temperature below 265° ° C. to form a deodorized oil.

12. The process according to claim 11, further comprising the step of
    e) re-bleaching the deodorized oil in presence of an acid-activated bleaching agent to form a re-bleached oil.

13. The process according to claim 12, further comprising the step of
    f) re-deodorizing the re-bleached oil at a deodorization temperature below 200° C.

14. The process according to claim 11, further comprising the step of
    f) re-deodorizing the deodorized oil at a deodorization temperature below 200° C.

15. The process according to claim 1 wherein the adsorbent is contacted with the vegetable liquid oil by adding the adsorbent to the vegetable liquid oil in an amount of not more than 0.3% (w/w).

* * * * *